3,629,319
URETHANE DIISOCYANATES
Charles W. Jonaitis, New Hope, and Lyle E. Elmquist, North St. Paul, Minn., assignors to General Mills, Inc.
No Drawing. Filed Sept. 11, 1968, Ser. No. 759,196
Int. Cl. C07c 125/04; C10m 3/20
U.S. Cl. 260—468 C
4 Claims

ABSTRACT OF THE DISCLOSURE

Compounds having the general formula

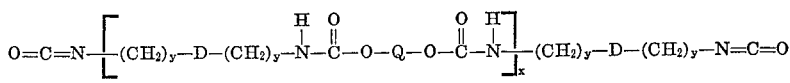

where $y$ is 0 or 1, $x$ is 1 to about 10, D is the divalent hydrocarbon group of dimerized fat acids and Q is the divalent group of a diol containing ether linkages. Compounds as above where the —N=C=O groups are blocked, preferably by reaction with certain oximes. Treatment of fibrous materials with such compounds.

The present invention relates to new diisocyanate base compounds and the use thereof in treating fibrous materials. More particularly, it relates to such compounds prepared from diisocyanates derived from dimerized fat acids and certain diol compounds. It also particularly relates to the treatment of various fibrous materials, and especially fabrics, with such compounds to soften and improve other properties of said materials.

It was recently discovered that polyisocyanates derived from polymeric fat acids were useful as treating agents for fibrous materials, serving to soften and improve water repellency of the fibrous materials. At the lower levels of usage the softening effects are more evident whereas at the higher levels of usage the water repellency effects are more evident. However, even at the lower usage levels, the treated fibrous materials show some increased water repellency which is undesirable in certain instances, such as in the treatment of diapers. Furthermore, the described polyisocyanates per se do not aid in the removal of stains from the so-called permanent press fabrics. In the latter instance, the very chemicals that transform a polyester-cellulosic blend into a durable-press fabric apparently make the fabric susceptible to permanent staining and discoloration.

It is an object of the present invention to provide new compounds based on diisocyanates derived from dimerized fat acids and certain diols. Another object of the invention is to provide a process for treating fibrous materials with such new compounds whereby the softness and soil release properties of the materials are improved and the rate that water is absorbed is increased over fibrous materials treated with the diisocyanates per se. A further object of our invention is to provide improved treated fibrous products. These and other objects will becme apparent from the following detailed description.

We have now discovered new compounds which are highly useful for treating fibrous materials. Our new compounds are prepared by reacting an excess of diisocyanate derived from dimerized fat acids with certain diols. The resulting isocyanate terminated compounds can be used as such or can be blocked with various blocking agents, the blocked compounds also forming part of the invention. The compounds soften the fibrous materials while significantly increasing the rate that water is absorbed thereby over fibrous materials treated with the diisocyanates per se. Thus the present invention provides fibrous materials having materially improved softness and good rewetting properties. The fibrous materials also have improved soil release properties which is of considerable importance where the materials are so-called permanent press fabrics.

The diisocyanates used in the present invention are derived from dimerized fat acids and have the following structural formula:

$$OCN—(CH_2)_y—D—(CH_2)_y—NCO$$

where $y$ is 0 or 1 and D is the divalent hydrocarbon group of the dimerized fat acids. The diisocyanates of the above formula wherein $y$ is 0 are prepared by converting the dimerized fat acids to the corresponding dimeric acid chlorides, reacting the acid chlorides with a metal azide to form the dimeric acyl azides and then heating the acyl azides to produce the diisocyanates. This method of preparation can be conveniently illustrated by the following equations:

The diisocyanates wherein $y$ is 1 are prepared by converting the dimerized fat acids to the corresponding dinitriles and then hydrogenating the dinitriles in the presence of ammonia and a catalyst such as Raney nickel to form diamines. The diamines are then reacted with phosgene to give the diisocyanates. This method of preparations can be conveniently illustrated by the following equations:

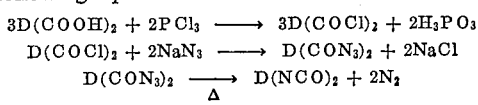

The dimeric fat acids, useful as the starting materials for preparing the above diisocyanates, are prepared by polymerizing ethylenically unsaturated monobasic carboxylic acids having 16 to 22 carbon atoms or the lower alkyl esters thereof.

The preferred acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis - 9 - octadecenoic (oleic), trans - 9 - octadecenoic (elaidic), 11-octadecenoic (vaccenic), 12-octadecenoic and the like. Representative octadecadienoic acids are 9,12 - octadecadienoic (linoleic), 9,11 - octadecadienoic, 10,12-octadecadienoic, 12,15-octadecadienoic and the like.. Representative octadecatrienoic acids are 9,12,15-octadecatrienoic (linolenic), 6,9,12 - octadecatrienoic, 9,11,13-octadecatrienoic (eleostearic), 10,12,14-octadecatrienoic (pseudoeleostearic) and the like. A representative 18 carbon atom acid having more than three double bonds in moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11 - eicosenoic, 6,10,14 - hexadecatrienoic (hiragonic), 4,8,12,16-eicosatetraenoic, 4,8,12, 15,18 - eicosapentanoic (timnodonic), 13 - docosenoic (erucic), 11-docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the dimerization of the unsaturated acids. Lower temperatures are generally used when a catalyst is employed.

The polymerization of the described ethylenically unsaturated acids yields relatively complex products which usually contain a predominant portion of dimerized acids, a smaller quantity of trimerized and higher polymeric acids and some residual monomers. The 32 to 44 carbon atom dimerized acids can be obtained in reasonably high purity from the polymerization product by vacuum distillation at low pressures, solvent extraction or other known separation procedures. The polymerization product varies somewhat depending on the starting fat acid or mixture thereof and polymerization technique employed—i.e. thermal, catalytic, particular catalyst, conditions of pressure, temperature, etc. Likewise, the nature of the dimerized acids separated from the polymerization product also depends somewhat on these factors although such acids are functionally similar attempts have been made to fully delineate the structures of dimerized acids prepared from ethylenically unsaturated acids. These studies have been based largely on the products obtained by polymerizing linoleic acid or the methyl esters thereof or starting materials rich in linoleic acid or methyl linoleate. Paschke and Wheeler, in a study relating principally to the thermal polymerization of normal methyl linoleate, stated that at least two main products have been identified by others as resulting from such polymerization:

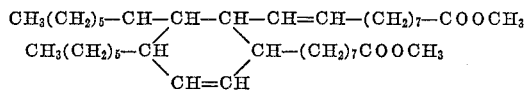

and

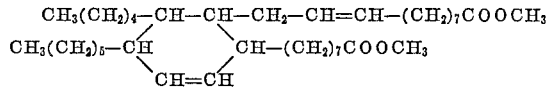

Their experimental work then indicated the latter structure predominated in the thermal polymerization product (The Journal of the American Oil Chemists Society, vol. XXVI, No. 6, June 1949, pages 278–83). Moore theorized (using the Diels-Alder mechanism) that the polymerization of linoleic acid would yield a variety of 36 carbon atom acids of high structural similarity (Paint, Oil & Chemical Review, Jan. 4, 1951, pages 13–15, 26–29). Thus it was generalized that a portion of normal linoleic acid having the structure $$CH_3(CH_2)_4CH=CHCH_2CH=CH(CH_2)_7COOH$$

(depicted for convenience as R—C=C—C—C=C—R')
would be conjugated during the polymerization to the 9,11 acid:

$$CH_3(CH_2)_4CH_2CH=CHCH=CH(CH_2)_7COOH$$

(depicted for convenience as R—C=C=C—C=C—R')

It was then set forth that these acids could polymerize as follows:

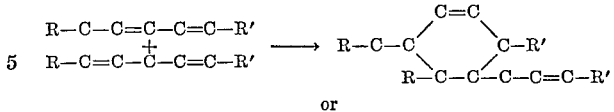

or

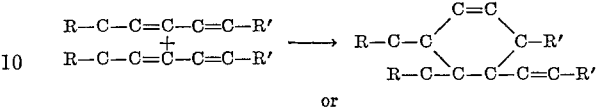

or

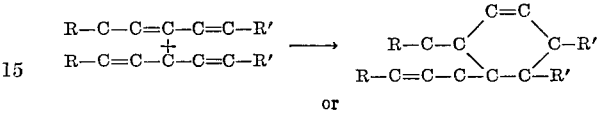

or

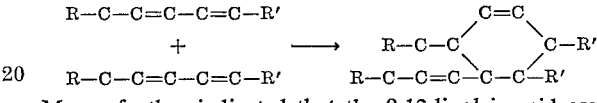

Moore further indicated that the 9,12-linoleic acid could also conjugate to the 10,12 acid and that this acid could self-polymerize or polymerize with the 9,12 or 9,11 acids. It was stated that the polymerizations could be "head-to-tail" as well as "head-to-head" as depicted above. Moore further stated that in many instances octadecatrienoic acids are present in many of the naturally occurring raw materials rich in octadecadienoic acids and that the self-polymerization of said acid could be depicted as follows:

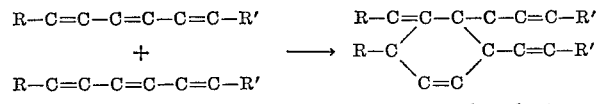

However, the author stated that such a product had not been isolated and that a second reaction probably takes place which could yield a diacid of the structure

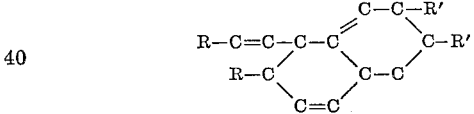

Ault et al. gave a possible structure for the dimer of methyl α-eleostearate, an ester of an octadecatrienoic acid, as follows:

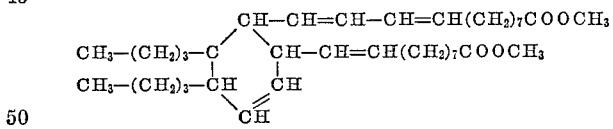

However, they also postulated that the structure could in fact be more complicated. Thus it was postulated that further cyclic rings were formed due to the high unsaturation giving a compound having the following proposed structure

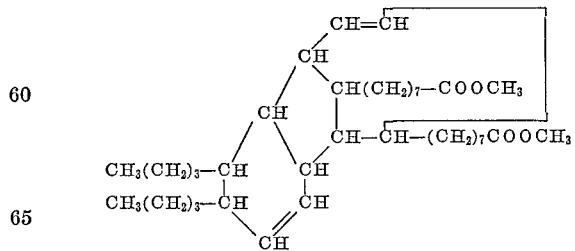

(Industrial and Engineering Chemistry, vol. 34, No. 9, September 1942, pages 1120–3).

Other information obtained is in essential agreement with the above studies. Thus analysis of dimerized acids prepared from linoleic acid rich starting materials using heat alone or heat plus a catalyst, such as an acid or alkaline clay, shows that the product contains structurally similar acids having monocyclic tetrasubstituted ring structures as well as acids with two and three rings, such additional rings generally being fused to the six carbon atom ring. The clay catalyzed dimerized acids have been shown to contain some aromatic rings according to ultraviolet and infrared spectroscopy. These aromatic rings are believed to be formed by hydrogen transfer (by catalytic action of clay) from a substituted cyclohexene ring to form a substituted benzene ring. Polymerization of pure oleic acid using a clay catalyst has been shown to yield a mixture of dimerized fat acids of which approximately 25–30% by weight have a one-ring cyclic structure with the remainder being non-cyclic. However, when mixtures of oleic and linoleic acids (such as from tall oil) are polymerized, the resulting dimerized fat acid contains little if any dimer having a non-cyclic structure.

It is thus apparent that the polymerization of the ethylenically unsaturated acids yields complex products. The dimer fraction thereof, generally consisting of a mixture of acids, can be assigned the formula:

HOOC—D—COOH where D is a divalent hydrocarbon group containing 30 to 42 carbon atoms. It is also apparent that said divalent hydrocarbon group is complex. However, from the noted studies and other information obtained, it can be seen that a mixture of acids normally results from the polymerization and subsequent fractionation and these acids have structural and functional similarities. Thus such mixture of acids contains a significant proportion of acids having a six carbon atom ring (about 25% or more even when the starting fat acid is a mono-olefinically unsaturated acid such as oleic). The remaining carbon atoms in the divalent hydrocarbon group of such ring containing acids are then divided between divalent and monovalent radicals which may be saturated or ethylenically unsaturated. Such radicals may form one or more additional cyclic structures which are generally fused to the first six membered ring. Many of such dimeric acids may be considered as having a theoretical idealized, general formula as follows:

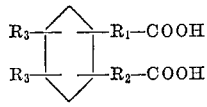

where $R_1$ and $R_2$ are divalent hydrocarbon radicals, $R_3$ and $R_4$ are monovalent hydrocarbon radicals and the sum of the carbon atoms in $R_1$–$R_4$ is 24–36. The ring may be saturated or it may contain one to three double bonds depending on the specific starting material, polymerization conditions and subsequent treatment including hydrogenation. It is also understood that the $R_1$–$R_4$ radicals may form one or more additional cyclic structures which are generally fused to the first ring.

As a practical matter, the dimerized fat acids are preferably prepared by the polymerization of mixtures of acids (or the simple aliphatic alcohol esters—i.e. the methyl esters) derived from the naturally occurring drying and semi-drying oils or similar materials. Suitable drying or semi-drying oils include soybean, linseed, tung, perilla, oiticica, cottonseed, corn, sunflower, dehydrated castor oil and the like. Also, the most readily available acid is linoleic or mixtures of the same with oleic, linoleinic and the like. Thus, it is preferred to use as the starting materials, mixtures which are rich in linoleic acid. An especially preferred material is the mixture of acids obtained from tall oil which mixture is composed of approximately 40–45% linoleic and 50–55% oleic. It is also preferred to carry out the polymerization in the presence of a clay. Partial analysis of the dimer fraction obtained from the product prepared by polymerizing the tall oil fatty acids in the presence of 10% by weight of an alkaline montmorillonite clay at a temperature of 230° C. and a pressure of 140 p.s.i. for five hours showed that it was a mixture of $C_{36}$ acids, the major proportion thereof being monocyclic of the above general formula with a substantial amount of the acids having a ring containing three double bonds (aromatic) and saturated side chains.

It is also to be understood that the said acids can be hydrogenated using palladium catalyst. Such mixture of hydrogenated dimeric fat acids was used in the preparation of the diisocyanate used in the examples of the present invention.

A wide variety of water soluble diols can be used in preparing the new compounds of the present invention. Such diols can be represented by the general structural formula:

HO—Q—OH where Q is an organic radical having a sufficient number of polyoxy groups to improve the rate of water absorbency of the fibrous materials treated therewith over fibrous materials treated with the described diisocyanate per se. The diols useful in our invention are thus hydroxy terminated polyethers having ethereal oxygen atoms separated by hydrocarbon chains which can be aliphatic, cycloaliphatic or aryl in nature. Such diols preferably consist of oxygen, carbon and hydrogen although the hydrocarbon chains may be substituted with inert groups which do not interfere with the compound preparation and do not adversely affect the fibrous material treatment. Representative inert groups are Cl, nitro and the like. Especially preferred diols are the polyalkylene glycols wherein the alkylene group contains 2 or 3 carbon atoms. These diols can be represented by the general structural formula $H(OR)_nOH$ where R is ethylene, trimethylene or propylene (i.e.—$CH_2\underset{\underset{CH_3}{|}}{C}H$—)

and $n$ is an integer representing the number of repeating units to give a molecular weight of from about 200 to 20,000 and higher. Polyethylene glycols are water soluble without reference to their molecular weights whereas polypropylene glycols become essentially water insoluble at a molecular weight of about 800–900. However, the latter diols can be made water soluble by adding polyoxyethylene groups at both ends of the polyoxypropylene chain. Such block polymers are particularly useful in the practice of our invention. They can be represented by the general structural formula:

$HO(CH_2CH_2—O)_a(\underset{\underset{CH_3}{|}}{C}HCH_2—O)_b(CH_2CH_2—O)_cH$ where $b$ is an integer representing the number of repeating polyoxypropylene units to give a molecular weight of about 900 to 5000 thereto and $a$ and $c$ are integers representing the number of repeating polyoxyethylene units to give water solubility to the polyoxypropylene unit. The molecular weight of the polyoxyethylene units will be from about 200 to 15,000. These diols are prepared by adding ethylene oxide to both ends of the polyoxypropylene starting material. They are commercial materials available from Wyandotte Chemicals as Pluronic® polyols.

The new compounds are prepared by reacting an excess of the diisocyanate with the diol, preferably in a solvent under reflux conditions. A catalyst such as $Bi(NO_3)_3 \cdot 5H_2O$ is also preferably used to speed the reaction. Typical solvents are tetrahydrofuran and dioxane. The equivalent ratio of diisocyanate to diol is from about 1:0.9 to 2:1, the latter ratio being particularly preferred. A slight excess of the diisocyanate over the 2:1 ratio can be employed but is not necessary.

The compounds can be represented by the following idealized structural formula:

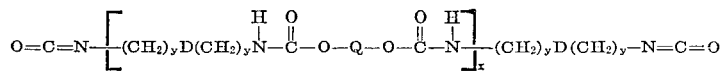

where $x$ is an integer of 1 to about 10. As indicated previously, the preferred compounds are those having the above formula wherein $x$ is 1 (diisocyanate to diol ratio of 2:1).

The invention also comprises the above compounds wherein the terminal —NCO groups are blocked with a blocking agent. Various blocking agents can be used with the proviso that the resulting blocked compound should be capable of unblocking at temperatures below about 175° C. and preferably between 25 to 175° C. While the compounds per se have considerable stability in the presence of water, the blocked compounds are stable for long periods of time and thus the aqueous treating solutions normally used in the treatment of the fibrous materials can be prepared well in advance of their use. However, where the blocked compounds are used, the resulting treated fibrous material must be heated to a temperature sufficiently high to unblock the compound.

A preferred group of blocking agents are oximes having from 1 to about 11 carbon atoms. Such oximes have the general formula

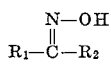

where $R_1$ and $R_2$ are hydrogen or alkyl groups of 1 to 10 carbon atoms with the proviso that the total number of carbon atoms in said groups does not exceed 10. Representative alkyl groups are methyl, ethyl, propyl, isopropyl, butyl, isobutyl, pentyl, hexyl, heptyl, octyl, 2-ethylhexyl, nonyl, decyl and the like. Preferred oximes are those in which the total number of carbon atoms in $R_1$ and $R_2$ is less than about 6. Especially preferred oximes are 2-butanone oxime and acetone oxime.

The blocked compounds are prepared by simply reacting the described compounds with the blocking agent and keeping the temperature below the point at which the blocked compound would unblock. Thus the temperature will vary with the blocking agent used and will generally be in the range of 25 to 130° C. Preferably, equivalent amounts of the compound and blocking agent will be employed. An excess of the blocking agent can be employed and then removed at the completion of the reaction. The reaction can be carried out in the presence of an organic solvent such as dioxane, acetone, mineral spirits, benzene, tetrahydrofuran or the like. The solvent is removed at the completion of the reaction. The blocking agent can be added to the reaction mixture of the diisocyanate and diol prior to stripping the solvent therefrom. Where an oxime is used, the terminal end groups of the compound will be converted to

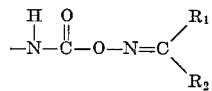

groups.

Our new compounds are useful for the treatment of fibrous materials as indicated above, which process also forms part of the invention. A wide variety of fibrous materials can be treated. These materials are principally cellulosic in nature, although the invention may also be used for the treatment of noncellulosic fibers, such as wool and other animal fibers as well as synthetic cellulosic and noncellulosic fibers. It finds particular use in the treatment of cotton fabrics where softening is desired and mixtures of cotton and polyester fibers where softening and soil release properties are desired. The invention is applicable to the treatment of woven textile materials as well as fibrous sheets, pads, films, mats and the like. The fibrous materials can be treated with the compounds by bringing the same in contact with the desired amount of the said compounds. The compounds are used in an amount sufficient to increase at least the softness of the fibrous materials. Preferably from about 0.01 to 25.0% will be used based on the dry weight of the fibrous materials. While a desired reasonably uniform contacting of the fibrous materials with the compounds can be obtained using organic solvent (i.e. perchloroethylene) solutions thereof, it is preferred to use aqueous emulsions or dispersions of the compounds. The compounds can be present in the emulsions or dispersions in widely varying amounts and preferably in amounts of about 0.05 to 50% by weight. Where our new compounds are not self-emulsifying, an emulsifying agent can be added. Emulsions are preferred over mere dispersions since they tend to retain their homogeneous nature for longer periods of time without continued agitation. The fibrous materials are dipped into the emulsion or dispersion in a preferred procedure although any procedure such as spraying and the like can be employed to obtain the desired reasonably uniform impregnation of the fibrous material with the requisite amount of the compound. Where a blocked compound is employed, the impregnated fibrous material is heated subsequent to the contacting to unblock the compound.

The nature of the reaction, if any, between our compounds and the fibrous materials is not known. It is, of course possible that the isocyanate groups may react with hydroxyl groups or other functional groups in the cellulosic molecule or may react with amine groups or other functional groups in noncellulosic fibrous materials such as wool. Another possibility is that the action which is obtained is physical in nature. A further possibility is that the polyisocyanates may form homopolymers through reaction between water and the isocyanate groups to form polyureas. Regardless of what the physical or chemical action is which takes place, it has been observed that the compounds do modify the physical properties of the fibrous materials in the way described. This modification is preferably accelerated by heating the impregnated fibrous materials to temperatures above 25° C. and below that 175° C.

The following examples serve to illustrate certain prefererd embodiments of the invention and are not to be considered as limiting.

EXAMPLE I

To 1600 ml. tetrahydrofuran containing 2.0 g. slurried $Bi(NO_3)_3 \cdot 5H_2O$ were added 637 g. (2.1 equivalent) of dimeryl isocyanate of the formula

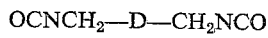

(D being the hydrocarbon radical of the dimerized acids prepared by polymerizing and hydrogenating the mixture of linoleic and oleic acids obtained from tall oil) and 950 g. (1.0 equivalent) Puronic® L35 (a block polymer of the formula

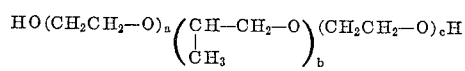

having an average molecular weight of 1900, the polyoxypropylene portion thereof having a molecular weight of about 950). After refluxing (72° C.) for one hour, the reaction mixture was filtered under vacuum (through Celite) to remove the catalyst. The tetrahydrofuran solvent was then removed using a flash evaporation under high vacuum. The product analyzed 2.6–2.7% isocyanate (2.71% is theory for the compound). It had the idealized formula:

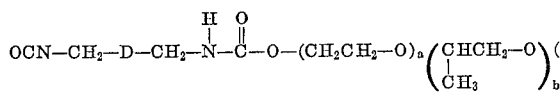 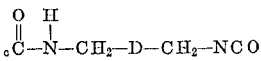

EXAMPLES II–V

Using the same procedure, compounds were prepared from Pluronics® L31, L44, L64 and L72, respectively. These diols have the general formula as set forth in Example I for Pluronic® L35 but vary in molecular weight, polyoxypropylene content and/or polyoxyethylene content. Thus L31 has an average molecular weight of 1100 and a polyoxypropylene unit molecular weight of 950; L44 has an average molecular weight of 2200 and a polyoxypropylene unit molecular weight of 1200; L64 has an average molecular weight of 2900 and a polyoxypropylene unit molecular weight of 1750; and L72 has an average molecular weight of 2850 and a polyoxypropylene unit molecular weight of 2050. The resulting compounds had the same idealized general formula as the compound of Example I. Further information on the various Pluronics® is found in Wyandotte Chemicals Corporation Technical Data Sheet O–62R entitled Typical Physical Properties of Pluronic® Polyols.

EXAMPLE VI

Birdseye cotton swatches (12" x 18") were padded with water emulsions of the compounds of Examples I–V using an Atlas padder and wringer at about a 150% wet pick-up swatches drawn through the emulsion and then (wrung out to the indicated wet pick-up). The emulsion make-up and the amount of the compounds picked up based on the dry weight of the cloth were as follows:

TABLE I

| Compound | Emulsion make-up | | Dry pick-up of compound, percent by wt. |
|---|---|---|---|
| | Concentration, percent by wt. | Emulsifier [4] | |
| Example: | | | |
| I | 0.172 | Triton X–405 [1] | 0.258 |
| II | 0.129 | Igepal CO–530 [2] | 0.194 |
| III | 0.189 | Triton X–405 | 0.284 |
| IV | 0.227 | Triton X–405 | 0.341 |
| V | 0.225 | Igepal CO–850 [3] | 0.338 |

[1] Octyl phenoxy polyethoxy ethanol containing about 40 moles of ethylene oxide per mole (Rohm & Haas).
[2] A condensation product of nonyl phenol and ethylene oxide containing about 6 moles of the ethylene oxide per mole (General Aniline and Film).
[3] Same as ([2]) except contains about 20 moles of ethylene oxide per mole.
[4] Used at a concentration of 10% by weight based on the weight of the compound.

The swatches thus were impregnated with approximately 0.1% by weight of combined dimeryl isocyanate based on the weight of the dry cloth. The impregnated swatches were heated for 40 minutes up to 112° C., rinsed in water, dried again for 20 minutes up to 112° C. and tested for water absorbency. They all absorbed water at a faster rate than swatches treated similarly with 0.1% of the dimeryl isocyanate. The swatches were at least as soft as those treated with the dimeryl isocyanate.

EXAMPLE VII

The procedure of Example VI was repeated except that the compounds prepared from Pluronics® L35 and L44 were used at levels of 0.1% and 0.258% and 0.284%, respectively, based on the dry cloth weight. The resulting swatches were compared to an untreated control. Swatches treated with 0.1% by weight of the dimeryl isocyanate per se were also compared to the control. The specimens of cotton thus treated were suitably coded and then subjected to a softness test by a panel of women after being washed 1, 15 and 26 times in an automatic washer using Tide detergent with intermediate drying. The numbers in the following Table II indicate the number of times the indicated swatches were chosen as being softer out of 24 tests. The table also shows the rewetting properties of the swatches treated with the compounds of the invention and dimeryl isocyanate (observing the speed that water dropped on the dry cloth wetted and soaked into the cloth).

TABLE II

| Treatment | Washes | Times chosen softer | | Rewetting |
|---|---|---|---|---|
| | | Control | Treated | |
| 0.258% dimerly isocyanate/L35 compound. | 1 | 7 | 17 | Almost instant. |
| | 15 | 0 | 24 | Do. |
| | 26 | 5 | 19 | Instant. |
| 0.1% dimeryl isocyanate/L35 compound. | 1 | 1 | 23 | Almost instant. |
| | 15 | 2 | 22 | Instant. |
| | 26 | 3 | 21 | Do. |
| 0.284% dimeryl isocyanate/L44 compound. | 1 | 0 | 24 | Slow. |
| | 15 | 1 | 23 | Almost instant. |
| | 26 | 0 | 24 | Instant. |
| 0.1% dimeryl isocyante/L44 compound. | 1 | 1 | 23 | Almost instant. |
| | 15 | 5 | 19 | Instant. |
| | 26 | 7 | 17 | Do. |
| 0.1% dimeryl isocyanate. | 1 | 2 | 22 | Slow. |
| | 15 | 3 | 21 | Almost instant. |
| | 26 | 8 | 16 | Instant. |

The above data show that the compounds materially soften the cotton cloth which softening action is reasonably permanent. In addition, the water absorbency properties are good and especially at the 0.1% treatment level. At the 0.1% level the cloth is treated with approximately 0.035 to 0.039% combined dimeryl isocyanate. At such level the compounds are comparable softening agents to the 0.1% dimeryl isocyanate and give the cloth significantly improved rewetting properties.

EXAMPLE VIII

To 500 g. of the compound of Example I were added 29.5 g. of butanone oxime. The reaction mixture was stirred during the addition while maintaining the temperature below 35° C. The resulting recovered blocked compound had the same idealized formula as the compound of Example I except that the terminal —NCO groups were changed to

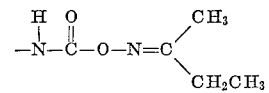

groups.

EXAMPLE IX

Example VII was essentially repeated except that the compound of Example I was used as a 0.087% by weight aqueous solution using 0.025% by weight N-cetyl-ethyl morpholinium ethosulfate (35% by weight aqueous solution) as the solubilizing agent and as a 0.087% by weight aqueous emulsion using 0.009% by weight of an ethoxylated amide as the emulsifier (Ethomid HT/60— an ethoxylated hydrogenated tallow amide containing 50 moles ethylene oxide per mole). The blocked compound of Example VIII was also used as a 0.091% by aqueous emulsion using 0.009% by weight of the Ethomid HT/60 emulsifier. The unblocked and blocked compounds of the invention were used at a level of 0.13% and 0.136% by weight, respectively, based on the dry weight of the cloth (represents a level of 0.05% by weight combined dimeryl isocyanate). The cloths impregnated with the compound of Example I and the dimeryl isocyanate were heated up to 110° C. for 40 and 20 minutes and the cloth impregnated with the blocked compound was heated at 110° C. for 20 minutes and 150° C. for 20 minutes. The treated cloths along with one treated with 0.1% by weight dimeryl isocyanate per se were tested as in Example VII with the results being set forth in the following Table III.

TABLE III

| Treatment | Washes | Times chosen softer Control | Times chosen softer Treated | Rewetting |
|---|---|---|---|---|
| 0.13% Example I compound solution. | 1 | 0 | 24 | Slow. |
|  | 15 | 1 | 23 | Almost instant. |
|  | 26 | 6 | 18 | Do. |
| 0.13% Example I compound emulsion. | 1 | 4 | 20 | Almost instant. |
|  | 15 | 5 | 19 | Instant. |
|  | 26 | 5 | 19 | Do. |
| 0.136% Blocked Example I compound. | 1 | 1 | 23 | Instant. |
|  | 15 | 5 | 19 | Do. |
|  | 26 | 4 | 20 | Do. |
| 0.1% dimeryl isocyanate. | 1 | 3 | 21 | Slow. |
|  | 15 | 10 | 14 | Almost instant. |
|  | 26 | 0 | 24 | Do. |

The above data show the good softening effects of the compounds at the 0.05% level of combined dimeryl isocyanate and also the good rewetting properties of the treated cloth. The use of the solution resulted in some water repellency and thus the preferred method of application is by the use of emulsions.

EXAMPLES X–XV

Example I was essentially repeated except that 2:1 equivalent ratios of dimeryl isocyanate and diol were used, the diols being Pluronics® P85, F88, P75, F38, F68, and F98, respectively. These diols also have the same general formula as set forth in Example I for Pluronic® L35 but vary in molecular weight, polyoxypropylene content and/or polyoxyethylene content. Thus P85 has an average molecular weight of 4,600 and a polyoxypropylene unit molecular weight of 2250; F88 has an average molecular weight of 10,800 and a polyoxypropylene unit molecular weight of 2250; P75 has an average molecular weight of 4,150 and polyoxypropylene unit molecular weight of 2050; F38 has an average molecular weight of 5000 and a polyoxypropylene unit weight of 950; F68 has an average molecular weight of 8,350 and a polyoxypropylene unit weight of 1750; and F98 has an average molecular weight of 13,500 and a polyoxypropylene unit weight of 2750. The compounds were blocked as in Example VIII by reaction with 2-butanone oxime. An excess of the oxime was added to the reaction mixture prior to removal of the catalyst or solvent. Refluxing was continued for about an additional one-half hour and then the catalyst and solvent were removed by filtration and flash evaporation.

EXAMPLES XVI–XIX

Twenty percent by weight aqueous emulsions of each of the compounds of Examples VIII and XII–XIV were prepared. The compounds of Examples XII–XIV formed stable emulsions without the addition of emulsifiers. The compound of Example VIII was used in combination with 10% by weight, based on the weight of the compound, of Triton X–405 to form a stable emulsion. The respective emulsions were each applied to 11" x 11" swatches of polyester-cotton fabric (Dacron 54/cotton, 65/35 blend, style No. 7402A) by padding to obtain approximately a 100% pick-up (thus the swatches were treated with approximately 20.0% of the compounds). The swatches were dried in a forced air oven for sixty minutes at 100° C. and cured at 150° C. for thirty minutes. Each treated fabric sample as well as an untreated control were spotted with approximately five drops of used motor oil, French's mustard, soy sauce, catsup, and dry cleaner sludge (still bottoms) which were left on the samples for thirty minutes. The excess was then blotted off and the samples were air dried for in excess of ten minutes. The samples were laundered for one cycle in a commercial washer at 140° F. with one cup of Tide detergent and a ballast of terrycloth towels to make a full eight-pound load. They were then tumble-dried for ten minutes and visually rated for soil release properties as follows:

| Appearance: | Rating |
|---|---|
| No stain removal | 1 |
| Considerable stain | 2 |
| Readily noticeable stain | 3 |
| Slight stain | 4 |
| Complete stain removal | 5 |

Results were as follows:

TABLE IV

| Sample | Used motor oil | Dry cleaner sludge | Soy sauce | mustard | Catsup |
|---|---|---|---|---|---|
| Untreated (Control) | 1 | 3 | 4 | 2 | 4 |
| Treated with compound of Example XII | 4 | 4 | 5 | 4 | 5 |
| Treated with compound of Example XIII | 3 | 4 | 5 | 4 | 5 |
| Treated with compound of Example XIV | 4 | 4 | 5 | 4 | 5 |
| Treated with compound of Example VIII | 5 | 5 | 5 | 5 | 5 |

The above data show that the compounds of the present invention yield treated permanent press fabrics with greatly improved soil release properties.

It is to be understood that the invention is not to be limited to the exact details of operation or the exact compositions shown or described, as obvious modifications and equivalent will be apparent to those skilled in the art and the invention is to be limited only by the scope of the appended claims.

The embodiments of the invention in which an exclusive property or privilege is claimed are defined as follows:

1. A compound of the structural formula:

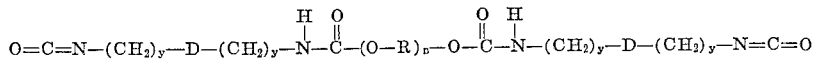

$$O=C=N-(CH_2)_y-D-(CH_2)_y-N-\overset{O}{\underset{H}{C}}-(O-R)_n-O-\overset{O}{\underset{H}{C}}-N-(CH_2)_y-D-(CH_2)_y-N=C=O$$

where $y$ is 0 or 1, D is the 30 to 42 carbon atom divalent hydrocarbon group of dimerized fat acids, said dimerized fat acids having been prepared by polymerizing ethylenically unsaturated monobasic carboxylic acids having 16 to 22 carbon atoms, R is ethylene, trimethylene or propylene and $n$ is an integer representing the number of repeating (O—R) units to give a molecular weight of from about 200 to 20,000.

2. A compound according to claim 1 wherein $-(O-R)_n-O-$ is

$$-O(-CH_2CH_2-O)_a(-\underset{\underset{CH_2}{|}}{C}HCH_2-O)_b(-CH_2CH_2-O)_c-$$

where $b$ is an integer representing the number of repeating polyoxypropylene units to give a molecular weight of about 900 to 5000 thereto and $a$ and $c$ are integers representing the number of repeating polyoxyethylene units to give a molecular weight of about 200 to 15,000 thereto.

3. A compound according to claim 2 wherein the polyoxypropylene units have a molecular weight of about 950 and polyoxyethylene units have a molecular weight of about 950.

4. A compound according to claim 3 wherein $y$ is 1 and D contains 34 carbon atoms.

References Cited
UNITED STATES PATENTS

| | | | |
|---|---|---|---|
| 2,900,368 | 8/1959 | Stilmar | 260—453 X |
| 2,969,386 | 1/1961 | McElroy | 260—471 |
| 3,040,002 | 6/1962 | Aldridge | 260—453 X |
| 3,455,883 | 7/1969 | Namal | 260—453 X |

CHARLES B. PARKER, Primary Examiner

D. H. TORRENCE, Assistant Examiner

U.S. Cl. X.R.

117—139.5 CQ; 260—349, 405.5, 407, 453 A, 453 AL, 453 PH, 465.8, 464, 471 C, 482 B, 563 R, 563 P, 583 H, 583 P